United States Patent

[11] 3,527,172

| | | | |
|---|---|---|---|
| 3,424,199 | 1/1969 | Breitholtz | 251/65 |
| 3,439,895 | 4/1969 | Marandi | 251/45X |

Primary Examiner—Robert W. Jenkins
Attorney—Prangley, Clayton, Miller, Dithmar and Vogel

[72] Inventors Harvey R. Krueger
Carpentersville, Ill.
Arthur A. Morgan, Palatine, Illinois
[21] Appl. No. 756,592
[22] Filed Aug. 30, 1968
Continuation-in-part of Ser. No. 708,121,
Feb. 26, 1968, now Pat. No. 3,443,508.
[45] Patented Sept. 8, 1970
[73] Assignee Reynolds Products, Inc.
Rolling Meadows, Illinois
a corporation of Illinois

[54] OVERFLOW CONTROL SYSTEM FOR AUTOMATIC BEVERAGE BREWER
4 Claims, 9 Drawing Figs.
[52] U.S. Cl............................................. 137/414,
99/282, 99/300, 137/400, 251/65
[51] Int. Cl............................................. F16k 31/18
[50] Field of Search................................ 137/414,
400, 401, 402; 251/65, 45; 99/282, 300

[56] References Cited
UNITED STATES PATENTS

| | | | |
|---|---|---|---|
| 3,320,970 | 5/1967 | McHenry | 137/414X |
| 3,376,013 | 4/1968 | Mallett | 251/65 |

ABSTRACT: There is disclosed herein an overflow control system for use in an automatic beverage brewer or the like, comprising, in combination, a tank for holding fluid therein, discharge means associated with the tank for discharging fluid therefrom, fluid inlet means including first valve means for introducing fluid into the tank when the first valve means is in an open position, means for operating the first valve means to the open position, means for operating the first valve means to a closed position after a predetermined quantity of fluid has been introduced into the tank, and magnetically controlled valve means disposed in the fluid inlet means and having a normally open position permitting fluid to flow therethrough and into the tank so long as the first valve means is in the open position and having a closed position preventing the flow of fluid to the tank, the magnetically controlled valve means being operable to the closed position thereof in response to the introduction into the tank of a quantity of fluid in excess of the predetermined quantity, thereby to prevent flooding of the tank.

Patented Sept. 8, 1970

INVENTORS
HARVEY R. KRUEGER
ARTHUR A. MORGAN.
BY
Prangley, Baird, Clayton, Miller & Vogel.
ATTYS.

3,527,172

OVERFLOW CONTROL SYSTEM FOR AUTOMATIC BEVERAGE BREWER

This application is a continuation-in-part of U.S. application Ser. No. 708,121, filed February 26, 1968 now U.S. Pat. No. 3,443,508 entitled Automatic Beverage Brewer.

This invention relates generally to an overflow fluid control system and more particularly to an overflow control system adapted for use in an automatic beverage brewing machine such as the type capable of automatically brewing predetermined amounts of coffee.

Generally, an automatic beverage brewer includes a water inlet system for automatically introducing a predetermined quantity of cold water to a water tank, means for heating the water in the tank, and means for delivering the heated water to a spray or discharge head to be sprayed or discharged over a predetermined amount of beverage producing material, whereby extract of the material is brewed and delivered to a beaker or the like for consumer usage.

In the majority of automatic beverage brewers now manufactured, an electrically operated valve and suitable controls are provided for introducing a predetermined quantity of cold water from the municipal supply system into the water heating tank of the beverage brewing machine. Such valves and controls are also used in other machines which are connected to a source of fluid and are cyclically operated, such as dish washers and clothes washers. It is desirable to provide suitable safety devices in all such machines which will operate in the event of malfunction of the electrically operated valve, and particularly to terminate the input flow of water to the receiving tank should the water in the tank exceed a predetermined quantity, thereby to prevent the tank from overflowing and damaging the machine.

Accordingly, it is a primary object of the invention to provide an overflow control system capable of preventing entry of fluid into a receiving tank in the event of a malfunction in the normal fluid inlet system which causes fluid in the tank to exceed a predetermined quantity.

It is a further object of the invention to provide an overflow control system which employs a novel float-operated magnetically controlled valve as part of the water inlet system, said valve being operative to terminate flow of water to the water tank in the event the amount of water within the tank exceeds a predetermined quantity.

It is a further object of the invention to provide an overflow control system employing a magnetically controlled valve means in an automatic beverage brewing machine having a positive displacement type water system, the machine further employing a unique water inlet control arrangement that operates without a timer or scale to control the input quantity of water to the machine.

It is a further object of the invention to provide an automatic beverage brewer of the character described which includes a hydraulically operated discharge valve to control discharge of hot water from the water tank of the machine, the discharge valve being controlled by operation of the water inlet system so that while cold water is flowing into the tank the valve remains closed to prevent discharge of hot water therefrom.

Still another object of the invention is to provide an improved float-operated magnetically controlled valve which is of a positive and rapid action and which is economical of manufacture and is relatively compact in size.

In accordance with one aspect of the invention, there is provided an automatic beverage brewing machine for brewing coffee or the like, the machine including a water tank having a side wall and a bottom wall and a top wall. Thermostatically controlled heating means is disposed within the water tank for heating and maintaining water therein at a beverage brewing temperature. Discharge means is associated with the water tank for discharging hot water therefrom and means is provided for receiving a beverage producing material to be covered by hot water from the discharge means. The automatic machine also includes water inlet means including an electrically controlled valve for introducing cold water into the tank to cause hot water in the tank to be discharged therefrom in an amount corresponding to the quantity of cold water introduced thereto; means being provided for opening the electrically controlled valve to cause cold water to flow into the water tank, and means being provided for closing the electrically controlled valve after a predetermined quantity of cold water has been introduced into the water tank. In accordance with the invention, float-operated magnetically controlled valve means also is disposed in the water inlet means, the magnetically controlled valve means having a normally open position permitting water to flow therethrough and into the water tank so long as the electrically controlled valve is in the open position and having a closed position preventing the flow of water to the water tank. The magnetically controlled valve means is operable to the closed position thereof in response to introduction into the water tank of a quantity of cold water in excess of the predetermined quantity of cold water, thereby positively terminating the inlet flow of water so as to prevent flooding of the machine.

Further features of the invention pertain to the particular arrangement of the elements of the automatic beverage brewing machine and the overflow control system therefor whereby the above-outlined and additional operating features thereof are attained.

The invention, both as to its organization and method of operation, together with further objects and advantages thereof, will best be understood by reference to the following specification when taken in connection with the accompanying drawings, in which.

Figure 1:
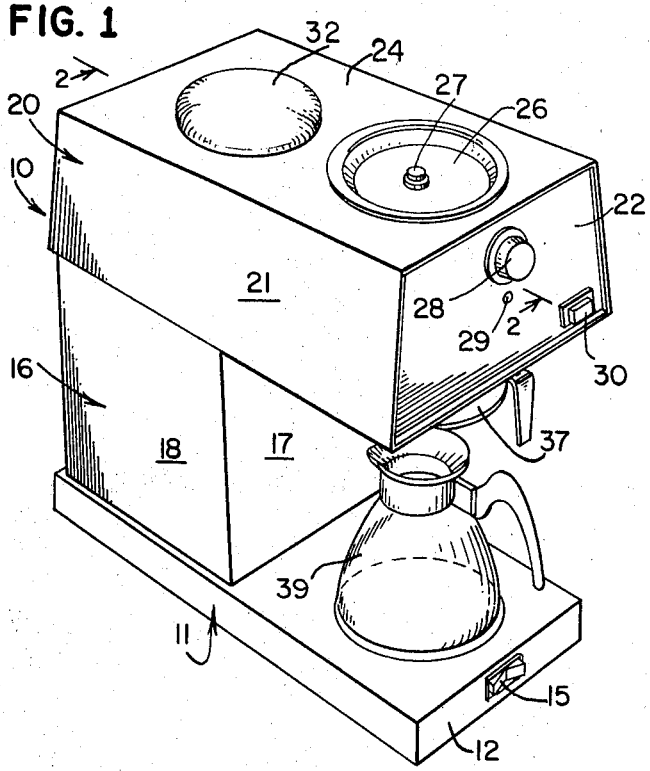
FIG. 1 is a perspective view of an automatic beverage brewing machine embodying the present invention.
Figure 2:
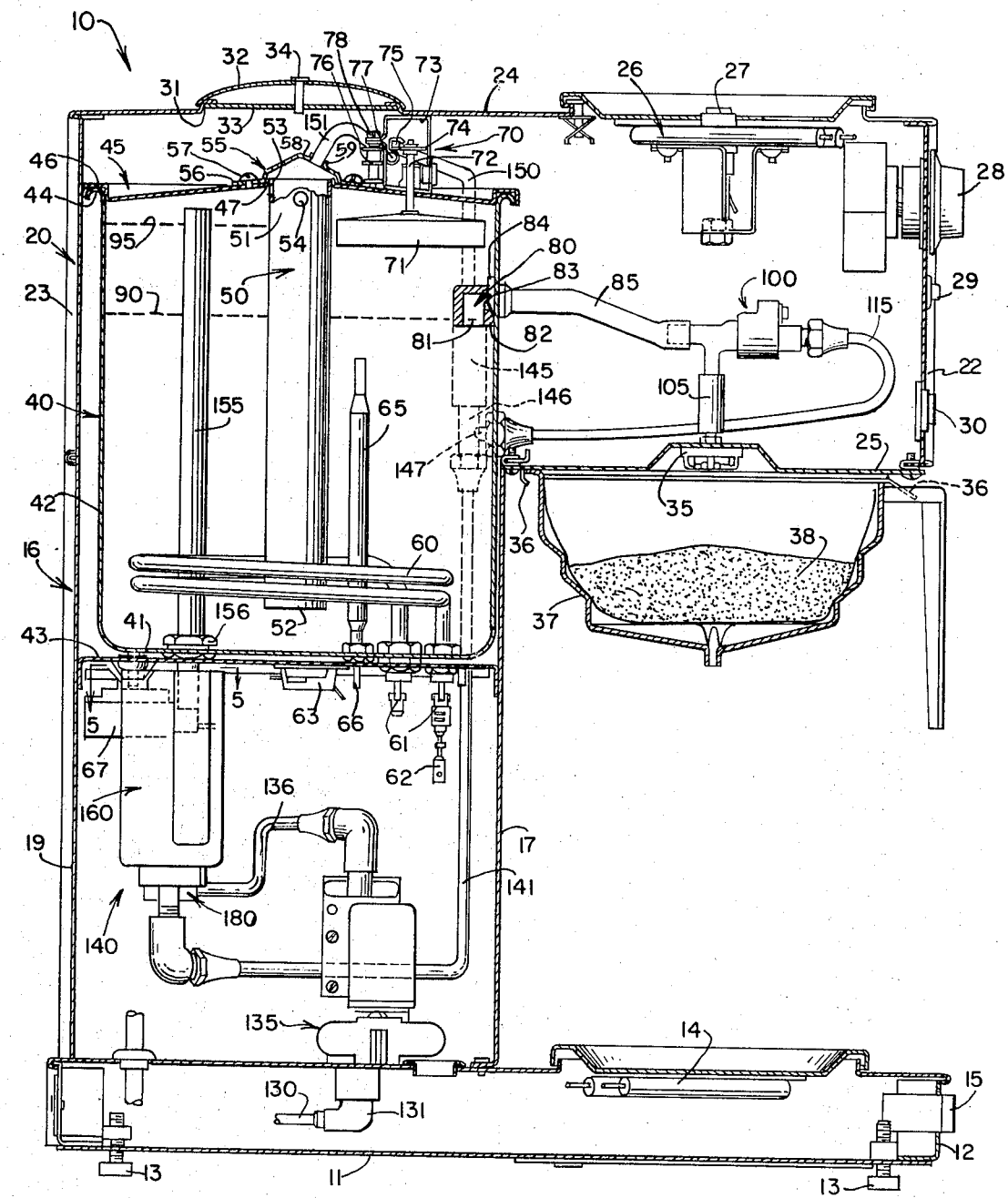
FIG. 2 is an enlarged view in vertical section of the beverage brewing machine of the present invention taken along the line 2—2 of FIG. 1, and illustrating the beverage brewing machine preparatory to a brewing cycle with the water tank partially full and a beverage producing material in the basket provided therefor.

Referring now to the drawings and more particularly to FIGS. 1 and 2 thereof, there is illustrated an automatic beverage brewing machine 10 which may be used for brewing coffee or the like. The beverage brewing machine 10 includes a generally rectangular base portion 11 having a forward control panel 12. A plurality of adjustably mounted legs 13 is provided in the base 11 for properly seating the machine on a counter top or the like.

A lower heating unit 14 is provided immediately below the upper surface of the base 11 and is disposed adjacent the front end thereof. The lower heating unit 14 is adapted to receive an associated beverage receiving beaker thereon. A lighted switch 15 is provided on the control panel 12 for controlling operation of the lower heating unit 14.

The machine 10 further includes a lower housing designated generally as 16, defined by an upstanding front wall 17, a pair of side walls 18 and a rear wall 19. An upper housing 20 is mounted on the lower housing 16 and includes the forwardly extending side walls 21, a front control panel 22, a rear wall 23, a top wall 24 and a bottom wall 25. As seen in the drawings, the upper housing 20 is substantially coextensive in length to the base 11.

The top wall 24 of the upper housing is provided with an upper heating unit 26 disposed substantially adjacent to the front end thereof. The upper heating unit 26 is provided with a centrally disposed thermal-responsive switch 27, a manual control switch 28 being provided on the front control panel 22 for controlling operation of the heating unit 26. A pilot light 29 is also provided on the front panel 22 and is energized when the switch 28 is an "on" position. A cycle control switch 30 is also provided on the front panel 22 of the upper housing, depression of the switch 30 effecting operation of the machine in the manner hereinafter described.

The top wall 24 of the upper housing 20 is further provided with an opening therein defined by an annular flange 31 (FIG. 2) which opening is normally closed by a domed cover 32 held in position by a plate 33 disposed below the top wall and a screw 34 holding the plate and cover 32 in engagement with the top wall.

The bottom wall 25 of the upper housing 20 is provided with a raised portion within which is disposed a discharge head 35, the discharge head being connected to the hot water discharge system as hereinafter described. The bottom wall 25 is also provided with a pair of longitudinally extending slides 36 (one only being shown), the slides 36 being provided to operably position a brew basket 37 below the discharge head 35. In operation, the brew basket 37 is provided with a filter paper cup containing the beverage producing material, in this case ground coffee as shown at 38. An associated beverage receiving beaker 39 is disposed on the lower heater 14 below the brew basket to receive the coffee extract flowing therefrom. The discharge head 35 may be of the type illustrated and described in the copending application of Peterson et al., Ser. No. 736,091, filed June 11, 1968, for Spray Discharge Head, and assigned to the same assignee as the present application; and the brew basket 37 may be of the type illustrated and described in the copending application of Reynolds et al., Ser. No. 668,384, filed September 18, 1967, now U.S. Pat. No. 3,479,949, also assigned to the same assignee.

The upper and lower housings 16 and 20 cooperate to provide an enclosure for a water tank 40. The water tank 40 includes a bottom wall 41 and a cylindrical side wall 42, the tank 40 being disposed upon a partition 43 which is provided in the lower housing 16. The upper end of the water tank 40 is provided with an outwardly turned annular lip 44. A cover 45 is disposed over the tank 40, the cover having a downwardly extending annular channel 46 formed thereon about the periphery thereof adapted to cooperate with the annular lip 44 on the water tank 40, thereby to prevent lateral movement of the cover 45 relative to the water tank 40. The cover 45 is provided with a centrally disposed and upwardly extending annular flange 47 which defines a centrally disposed opening therein adapted to receive the upper end of an upstanding tube 50 as hereinafter described.

A heating coil 60 is disposed within the water tank 40 substantially adjacent to the bottom wall 41 thereof, the terminals 61 of the heating coil 60 extending through the bottom wall 41 of the water tank and the partition 43 in the lower housing for connection through a fuse 62 with suitable conductors (not shown) to a terminal block 63 carried below the partition 43. A temperature responsive element or thermostat 65 is disposed within the water tank 40, the lower end 66 of the thermostat 65 extending through aligned openings in the bottom wall 41 of the tank and the partition 43 for connection to a tank thermostat switch 67 in a conventional manner. The arrangement is such that water in the water tank 40 is constantly maintained at an elevated temperature. This makes it possible to promptly draw off a supply of hot water from the water tank for the purpose of making coffee extract in the manner to be described.

Provision is made for automatically displacing a predetermined quantity of hot water from the upper portion of the water tank 40 by introducing an equal amount of water, preferably cold water, in the lower portion of the water tank; the upstanding tube 50 being provided for this purpose. The upper end 51 of the tube 50 is provided with a plurality of nibs (not shown) adapted to engage the upstanding annular flange 47 of the cover 45, whereby the tube 50 is removably carried by the cover.

The tube 50 extends downwardly within the tank 40, the lower end 52 thereof terminating near the bottom wall 41 of the tank. The upper end of the tube 50 is provided with a generally rectangular notch 53 which begins below the cover 45 and extends upwardly beyond the flange 47. The notch 53 places the interior of the water tank 40 in direct communication with atmosphere and provides for the escape of air from the upper end of the water tank 40 when hot water within the tank is upwardly displaced therein in response to the pouring of cold water through the tube 50. The upper end of the tube 50 is also provided with a plurality of openings 54 therein which permit the discharge of air from the tank and also permit water to flow out of the tube 50 and directly into the tank in the event water floods the tube and is prevented from entering the tank through the lower end of the tube.

In a typical construction of the tube 50, the tube itself is formed of stainless steel and is approximately 8⅝ inches long and it has an outer diameter of approximately 1¼ inches, the wall thereof being approximately .035 inch thick. The openings 54 are approximately one-fourth inch in diameter with the centers thereof being disposed approximately thirteen thirty-seconds of an inch below the upper end of the tube. The relatively large diameter of the tube provides twofold advantages: (1) it permits rapid introduction of the cold water to the bottom of the tank without great turbulence and (2) any liming effect or buildup of scale on the inner wall thereof will not interfere with the flow of incoming water as is the case where a tube having a small diameter is used.

With continued reference to FIG. 2, it will be seen that a foraminous or screen-like inlet cover 55 including an outer peripheral flange 56 is secured to the tank cover 45 by a plurality of screws 57. One side wall 58 of the inlet cover 55 is provided with an annular flange 59 which receives one end of a delivery conduit of the water inlet system hereinafter described, the inlet cover serving as an air break for the water inlet system to prevent back siphonage into the inlet water line in the event of a malfunction therein, such air break being required by virtually all local ordinances.

Still referring to FIG. 2, it will be seen that the cover 45 for the tank 40 also is provided with a float actuated switch mechanism designated generally as 70. The switch mechanism 70 includes a float 71 disposed within the tank 40 and having an upwardly extending float stem 72 secured thereto. The float stem 72 extends through an opening provided therefor in the tank cover 45. A generally rectangular bracket 73 is rigidly affixed to the cover 45, the bracket having an opening therethrough which receives the float stem 72 so as to permit reciprocal movement of the float stem therein. An arm 74 is rigidly secured to the float stem 72 within the bracket 73 and is movable therewith. The major portion of the arm 74 is disposed substantially normal to the stem 72, the outer end of the arm 74 being formed to provide a holding flange within which is disposed a horizontally extending magnet 75.

Downward movement of the float is limited by engagement of the arm 74 with a generally U-shaped bracket 76. A reed switch 77 is mounted within the bracket 76 and is operable in response to movement of the magnet 75 carried by the arm 74. The reed switch 77 includes terminals (not shown) for connection to suitable conductors. The U-shaped bracket 76 is held in position on the bracket 73 by a screw 78 which extends through tabs formed on the bracket 73 and the laterally extending arms of the bracket 76, the bracket 76 being vertically adjustable relative to the cover 45 by rotation of the screw 78, whereby the operative position of the switch 77 can be adjusted. The reed switch 77 may be of the type manufactured by Hamlin, Inc., as its switch number MRL—2.

In operation, as the hot water rises within the tank 40 and engages the float 71, the float 71 will rise within the tank causing the stem 72 also to rise, thereby raising the arm 74 and the magnet 75 mounted therein. When the magnet moves about one-half inch above the reed switch 77, the reeds therewithin will separate and thereby break the circuit through the switch. As the water level in the tank drops and the float 71 descends therein, the magnet 75 will approach the reeds of the reed switch 77, and, when the magnet is approximately one-fourth inch away, the magnetic force thereof will cause the reeds to close and again complete a circuit through the switch 77. The float actuated switch mechanism 70 is provided to control an electrically operated water inlet valve for the machine in a manner hereinafter described, suffice it to say for now that when the switch 77 is opened it breaks a circuit for the water inlet valve and terminates the input of cold water to the water tank.

The hot water discharge system for the machine also is illustrated in FIG. 2, wherein it is seen that the side wall 42 of the water tank 40 is provided with an opening therein which is disposed substantially below the upper end of the water tank and is adapted to receive and support a discharge block 80 therein, hot water being delivered from the tank 40 through the discharge block 80.

The discharge block 80 includes a vertically disposed passage 81 extending upwardly from the bottom surface 82 of the block and terminating as a discharge outlet 83 disposed normal to the passage 81. The discharge outlet 83 extends through the opening in the side wall of the water tank 40, a rubber gasket 84 being disposed about the discharge outlet 83 where it passes through the opening thereby to prevent water from leaking therebetween.

One end of a discharge line 85 is connected to the discharge outlet 83 of the block 80, the other end thereof being connected to a first inlet of a discharge valve 100, the discharge outlet from the valve 100 being connected to the spray discharge head 35. As illustrated, the discharge head 35 is mounted in spaced relation to the water tank 40 and is disposed below the discharge block 80 in the side wall of the water tank, the discharge head 35 being located below the upwardly deformed portion of the bottom wall 25 of the upper housing 20.

It will be understood that upward displacement of hot water within the tank 40 causes hot water to rise in the passage 81 until it reaches the discharge outlet 83, at which time hot water will flow through the discharge block 80, the discharge line 85, the discharge valve 100 (when open) and the discharge head 35 until the water level in the water tank drops below the lower surface 83 of the discharge block. When the water level drops below the lower surface 82 of the discharge block, to the level indicated as 90 in FIG. 2, the passage 81 of the discharge block provides an air gap between the discharge outlet 83 and the bottom surface 82 thereof which prevents the drawing off of additional water from the water tank 40. The lowest portion of the discharge outlet 83 and the lower surface 82 of the block are sufficiently spaced so that the passage 81 accommodates the expansion of cold water being heated in the tank without drippage thereof through the discharge outlet 83.

In a typical construction of the discharge block 80, the block itself is molded of silicone rubber with a hardness of approximately .40 durometer, the passage 81 has an inner diameter of approximately five-eighth inch, the discharge outlet 83 and the discharge line 85 each have an inner diameter of approximately five-sixteenth inch, and the lowest portion of the discharge outlet 83 is disposed about eleven thirty-seconds of an inch above the bottom surface 82 of the block. The passage 81 is formed of a larger diameter than the discharge outlet 83 to insure that a full stream of hot water enters the outlet 83, whereas if the passage 81 and the outlet 83 were of complementary diameters, it is possible that air bubbles might be entrained therein.

The discharge block 80 is suitably positioned in the side wall 42 of the water tank so that the volumetric capacity of the water tank 40 between the lower surface 82 of the discharge block and the actuated position of the float 71 is sufficient to receive at least about 60 ozs. of water when the hot water in the water tank is displaced to the upper portion of the tank, as indicated by the dashed line 95 in FIG. 2; the volumetric capacity of the tank 40 below the discharge block 80 being about 6 quarts of water. By adjusting the float stem 72 in the manner heretofore described, the capacity of the upper portion of the tank can be varied by approximately ±6 ozs.

The upper portion of the water tank above the discharge block 80 is intended to have a capacity corresponding to that of the associated beaker 39, whereby the introduction of a predetermined quantity of cold water into the water tank 40 will cause a substantially equal amount of hot water to be upwardly displaced therein and ultimately discharged as a beverage extract into the beaker 39.

As noted, the discharge line 85 is connected through the discharge valve 100 to the discharge head 35, the discharge head 35 being adapted to spray hot water in a plurality of streams at substantially uniform flow rates and in a particular overall pattern over the material 38 in the brew basket 37, the head 35 being illustrated and described in the aforementioned copending application Ser. No. 736,091, filed June 11, 1968, entitled "Spray Discharge Head."

Figure 3:
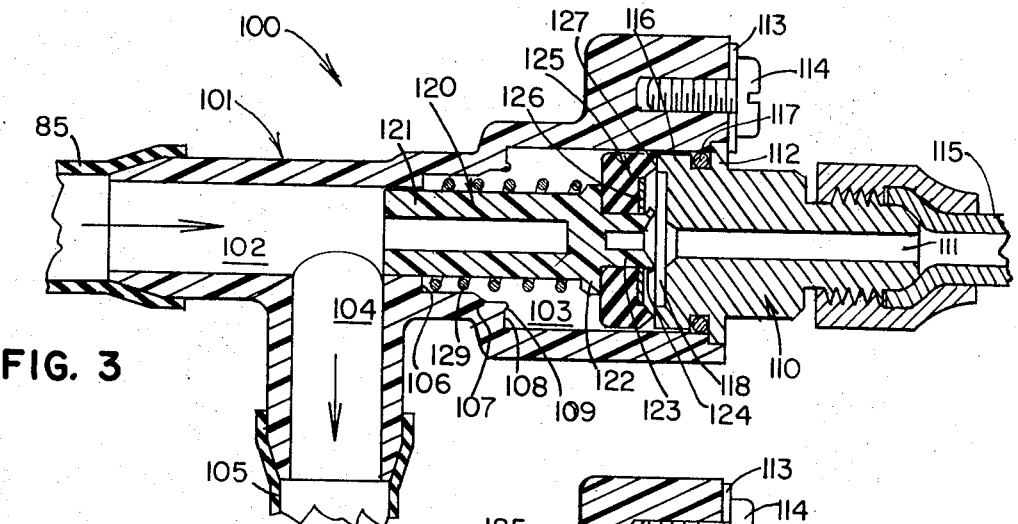
FIGS. 3 and 4 are enlarged views of the encircled area of FIG. 2, illustrating the construction of the hydraulically operated discharge valve in greater detail.
Figure 4:
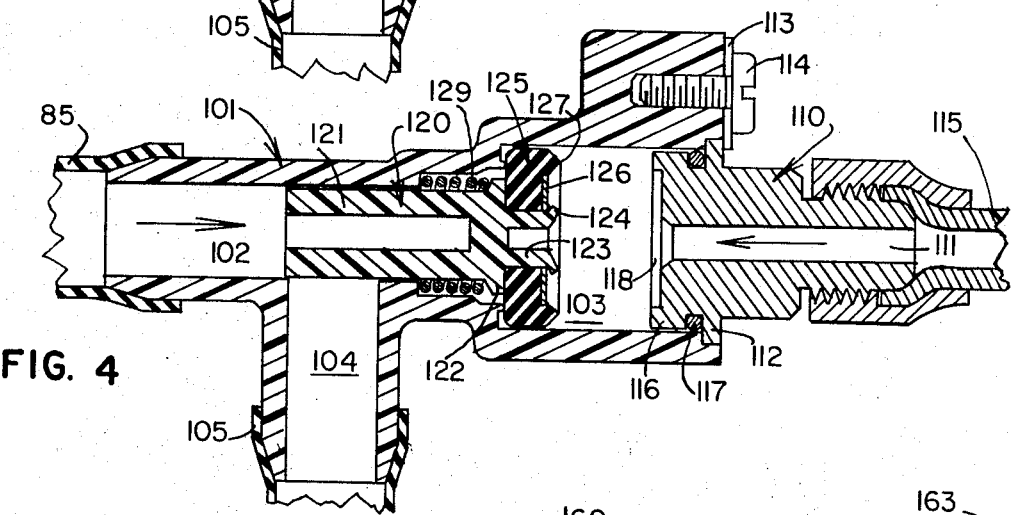

The discharge valve 100 for controlling discharge of hot water from the tank 40 is best illustrated in FIGS. 3 and 4. The valve 100 includes a generally T-shaped hollow body 101; one end of the head of the T providing a first inlet passage 102 adapted to be connected to the discharge line 85, the opposite end thereof being formed substantially larger and defining a generally cylindrical chamber 103 therein. The branch of the T defines a discharge passage 104 which is adapted to be connected by a conduit 105 to the inlet side of the discharge head 35.

An inlet fitting designated generally as 110 is rigidly secured to the body 101 and extends within the chamber 103 thereof. A plunger designated generally as 120 carrying a molded valve seat 125 thereon is disposed within the chamber 103 for reciprocal movement relative to the inlet fitting 110 and the inlet passage 102, the plunger 120 serving as a closure member which precludes flow of fluid through passage 104 when the plunger is in a closed position.

To complete the description of the body 101, it will be seen that the inlet passage 102 is provided with a first shoulder 106 formed therein immediately to the right of the discharge passage 104. The inner wall of the body 101 continues as a straight section for a short distance from the shoulder 106 and then tapers outwardly as at 107, terminating in a second shoulder 108 which forms the inner end of the chamber 103. The shoulder 108 is provided with an inwardly extending lip 109 thereon. The various sections 106 through 109 cooperate with the plunger 120 and with the valve seat 125 carried by the plunger to provide a relatively watertight seal between these parts so as to prevent leakage of fluid from the chamber 103 to the inlet passage 102, or in the opposite direction, the lip 109 providing a relatively small surface area upon which the valve seat 125 abuts, thereby to provide a good seal therebetween even under relatively low pressures.

The inlet fitting 110 is provided with an inlet passage 111 therethrough, the outer portion of the fitting 110 being adapted to be connected by an appropriate connector to a branch conduit 115 of the water inlet system hereafter described, whereby the inlet passage 111 is adapted to discharge water against the valve seat 125 and into the chamber 103.

The inlet fitting 110 is provided with a first annular flange 112 which seats within an appropriately provided recess formed in the end of the valve body 101; the inlet fitting 110 being held in position by a washer 113 which overlies one portion of the flange 112. The washer 113 is held in position by a screw 114 which engages an appropriately provided portion of the body 101. The inlet fitting 110 includes a second annular flange 116 at the inner end thereof, an O-ring 117 being disposed between the flanges 112 and 116 and the body 101 so as to provide a suitable seal therebetween. The inner end of the fitting 110 is provided with a generally cylindrical recess 118 for reasons hereafter explained.

The plunger 120 includes a generally cylindrical main body portion 121 which is of a diameter only slightly less than the diameter of the inlet passage 102 and is movable therein. The plunger includes an annular base 122 formed thereon, the base 122 being of a larger diameter than the main body portion 121. The plunger 120 further includes a second cylindrical portion 123 which extends outwardly from the base 122. The base 122 and the cylindrical portion 123 are provided to receive and retain the valve seat 125 thereon. A washer 126 holds the valve seat 125 on the plunger 120, the washer 126 overlying the valve seat 125 and being held in position by a plurality of retaining tabs 124 which are formed in the cylindrical portion 123 and which overlie the washer 126, thereby to maintain the valve seat 125 in firm engagement on the plunger 120. The valve seat 125 is provided with an annular pointed ridge 127, the ridge 127 being provided so as to minimize the surface contact between the valve seat 125 and the inner surface of inlet fitting 110, thereby to insure a good seal therebetween under relatively light pressures. The recessed portion 118 is formed in the inner end of the inlet fitting 110 to receive the retaining tabs formed on the plunger when the plunger is in the position shown in FIG. 3, whereby the ridge 127 of the valve seat can engage the fitting 110.

A compression spring 129 is disposed about the main body portion 121 of the plunger and extends between the lower surface of the annular base 122 and the first shoulder 106 formed in the valve body, the spring 129 acting to bias the plunger 120 to the right so that the seat 125 sealingly engages the inner end of the inlet fitting 110, thereby to prevent entry of water through the passage 111 of the inlet fitting and into the chamber 103.

In operation, when the discharge valve 100 is in the normal "open" position, with the plunger 120 to the right as shown in FIG. 3, hot water may flow from the water tank through the discharge block 80, the discharge line 85, into the inlet passage 102 thereof and out of the valve 100 via outlet passage 104 and conduit 105 to the inlet of the discharge head 35, whereupon it will be sprayed therefrom over the coffee grounds in the brew basket 37.

The discharge valve 100 is operable to a "closed" position when the plunger 120 is biased to the left, as shown in FIG. 4, at which time the main body portion 121 of the plunger operates to seal off the inner end of the outlet passage 104 and thereby prevent the flow of hot water therethrough. The discharge valve is operated to the "closed" position thereof by the pressure of cold water flowing through conduit 115 into the inlet passage 111 of the inlet fitting 110 and against the seat 125, such pressure being developed by the inlet water system in the manner hereinafter explained.

In a typical construction, the valve body 101 may be formed of a nylon material sold under the trade name Zytel 31; the valve body 101 being approximately 2.187 inches in length with the center of the discharge passage 102 thereof being disposed approximately .814 inch from the left hand end of the valve body. The shoulder 106 defining the end of the inlet passage 102 is disposed at approximately the midpoint of the head portion of the body, and the passages 102 and 104 are each five-sixteenth inch in diameter. The shoulder 108 formed in the side wall of the body 101 is disposed approximately .781 inches from the end of the body, the lip 108 being raised approximately .020 inches thereon; the tapered portion 107 being disposed at an angle of approximately 30° relative to the side wall of the body, and the side wall of the body defining the chamber 103 being approximately .640 inches in diameter.

The inlet fitting 110 is formed of yellow brass, the inlet passage 111 therein being approximately .109 inch in diameter. When the inlet fitting 110 is positioned within the chamber 103, the inner end thereof is disposed approximately .52 inch from the shoulder 108.

The plunger 120 is also formed of nylon as Zytel 31. The main body portion 121 of the plunger is approximately .695 inch in length and is approximately .295 inch in diameter; the base 122 thereof being approximately .065 inch in length and approximately .41 inch in diameter; the cylindrical portion 123 being approximately .19 inch in length including the retaining tabs 124 and being approximately .190 inch in diameter. The valve seat 125 is formed of hard rubber such as BUNA-"N" and is approximately .65 inch in diameter and .187 inches in height, including the annular ridge 127 thereon. As illustrated in the drawings, the body portions 121 and 123 of the plunger are hollow for molding purposes.

The water inlet system for the machine is illustrated in FIG. 2 and includes a water supply line 130 which is adapted to be connected to an available source of cold water. The supply line 130 is connected through an appropriate fitting 131 to the inlet side of an electrically controlled valve 135, the outlet of the valve 135 being connected through a conduit 136 to the inlet of a normally open float-operated magnetically controlled valve 140, the valve 140 forming part of the present invention.

The valve 140 is intended to operate as a safety valve so as positively to prevent the introduction of cold water to the water tank 40 in the event of a malfunction of the electrically controlled valve 135, or some other component of the system, which malfunction would cause overflow of water from the tank 40.

A conduit 141 connects the outlet of the magnetically controlled valve 140 to the inlet of a flow restrictor 145 through a T-shaped fitting 146. The fitting 146 has a branch outlet 147, to which is connected the conduit 115 which leads to the inlet fitting 110 of the discharge valve 100. The flow restrictor 145 serves to regulate the output flow of water therethrough to a relatively uniform flow rate of approximately one gallon per minute, regardless of the inlet water pressure thereto. The flow restrictor 145 may be of the type manufactured by the Dole Valve Company as their model No. M—38.

The outlet end of the flow restrictor 145 has a delivery conduit 150 connected thereto which extends upwardly above the water tank 40. The upper end of the delivery conduit 150 is bent to provide a downwardly directed portion 151 which is disposed within the flanged opening 59 formed in the side wall 58 of the inlet cover 55, thereby to discharge cold water into the upper end of the tube 60 where it flows by gravity to the lower end of the tank 40. By directing the water discharging from the conduit 150 toward the side of the tube 50 instead of directly downward, it is possible to minimize agitation of the hot water in the tank as the cold water is introduced.

The flow restrictor 145 causes the cold water to be discharged at a fairly uniform flow rate regardless of the incoming pressure thereto. When the pressure of the incoming water to the flow restrictor exceeds a certain value, back pressure is developed therein which causes some of the entering cold water to be diverted through the branch 147 of the T fitting and through the conduit 115 to the water inlet passage 111 of the discharge valve 100. The pressure of the water flowing through the passage 111 and against the valve seat 125 causes the plunger 120 to move to the "closed" position thereof illustrated in FIG. 4, whereby the main body portion 121 of the plunger closes off the discharge outlet 104 and prevents hot water from flowing therethrough. At this time the valve seat 125 abuts against the lip 109 formed in the chamber 103 so as to prevent flow of cold water from chamber 103 into the passage 102.

A pressure of approximately 1½ p.s.i. is required to hold the plunger 120 in the "closed" position thereof. This pressure will be developed when the line pressure to the flow restrictor 145 is approximately 10 p.s.i., whereby the minimum operating pressure for the machine using components of the type herein described is approximately 10 p.s.i. The back pressure created by the flow restrictor 145 generally increases in direct ratio to the increase in line pressure thereto.

In addition to providing the back pressure which controls the discharge valve 100, the flow restrictor 145 also insures that the water will flow into the water tank at a substantially uniform rate, whereby the water inlet cycle for the machine 10 will be relatively constant. The flow restrictor 145 also prevents rapid flooding of the tank should the inlet supply of water be at a high pressure.

The water inlet system and the hot water discharge system cooperate to admit only a predetermined quantity of water to the tank 40. In normal operation, when the electrically controlled valve 135 is energized, cold water flows through the supply line 130, the valve 135, conduit 136, valve 140 and into flow restrictor 145, wherein the back pressure created therein causes some of the incoming water to flow through the T passage 147 and thence through the conduit 115 so that it impinges upon and applies a constant pressure to the seat 125 of the plunger 120 in the discharge valve 100, the pressure being sufficient to cause the plunger 120 to move to the "closed" position thereof.

Concurrently with the closing of the discharge valve 100, cold water also flows out of the flow restrictor 145 through the delivery conduit 150, whereupon it is discharged through the inlet cover 55 into the upper end of the upstanding tube 50. The incoming cold water flows downwardly through the tube 50 to the bottom of the tank and causes hot water contained therewithin to be upwardly displaced within the tank. As the hot water in the water tank rises some of it will flow through the discharge block 80, the discharge line 85 and into the inlet passage 102 of the discharge valve 100. However, the pressure of the water flowing through the discharge head 80 is equal only to the head pressure of that water within the water tank which is disposed above the discharge block 80. The head pressure of the water and the force of the compression spring 129 on the left side of the plunger 120 are substantially less than the pressure of the cold water flowing through conduit 115 and against the seat 125 of the plunger 120, whereby the plunger 120 remains closed and prevents the discharge of hot water through the valve 100 and the discharge head 35.

Because the hot water is prevented from flowing out of the water tank 40 by the discharge valve 100 while the electrically controlled inlet valve 135 is open, cold water continues to flow into the bottom of the tank causing the hot water in the tank to rise above the discharge block 80 and to raise the float 71. The float stem 72 also rises and lifts the magnet 75 carried thereby away from the reed switch 77, whereby the switch 77 opens to break the electrical circuit to the valve 135 and thereby close same to prevent further introduction of cold water to the tank.

When the electrically controlled valve 135 closes, the back pressure developed by the flow restrictor 145 terminates and relieves the water pressure against the seat 125 of the plunger 120, whereby the head pressure of the hot water in the inlet passage 102 and the force of the spring 129 on the left side of the plunger 120 cause it to move to its normally open position as shown in FIG. 3, at which time the hot water can flow through the valve 120 via the discharge passage 104, through the conduit 105 and through the discharge head 35 and over the coffee grounds disposed in the brew basket 37. The water will continue to flow out of the discharge head until the water level within the tank drops to just below the bottom surface 82 of the discharge block 80, as indicated at 90 in FIG. 2, the air drawn into the tank through the notch 53 and the openings 54 in the upper end of the tube 50 providing an air gap in the passage 82 so that the flow of hot water from the water tank positively terminates.

As heretofore noted, discharge of hot water from the tank 40 terminates when the water reaches the level 90 illustrated in FIG. 2. Because the bottom surface 82 of the block 80 is disposed below the discharge outlet 83 therein, the standby level of water within the tank 40 is normally disposed below the discharge outlet 83, and, as previously described, the distance between the discharge outlet 83 and the bottom surface 82 of the block 80 is sufficient to accommodate expansion of the cold water within the tank upon the heating thereof to prevent drippage of water through the discharge outlet 83.

As previously noted, it is a primary object of the invention to provide an overflow control system for use in a beverage brewing machine of the type herein described, the overflow control system serving positively to terminate the flow of cold water into the water tank 40 in the event the amount of water therein exceeds a predetermined amount. To this end, the float-operated magnetically controlled valve means 140 has been provided.

To operate the valve means 140 in the manner hereinafter described, the water tank 40 is provided with an overflow pipe 155, the upper end of the pipe 155 being disposed at a predetermined maximum permissible water level within the tank. The pipe 155 extends through the bottom wall 41 of the tank 40 and the partition 43 for discharge into an overflow vessel 160, the vessel 160 being secured to the partition 43. The overflow pipe 155 is held in position within the water tank 40 by a pair of nuts 156 which are threaded thereon and are disposed on opposite sides of the bottom wall 41.

The float-operated magnetically controlled valve means 140 of the present invention is best illustrated in FIGS. 5 to 8 and includes a vessel 160 comprising a generally cylindrical side wall 161 and a bottom wall 162. The side wall 161 is provided with a vertically extending pocket 163 integrally formed therein, (FIG. 5), the pocket 163 receiving the lower end of the overflow pipe 155 as illustrated by the dashed lines in FIG. 6. The pocket 163 is formed in the side wall 161 in a manner such that a vertically extending passage 164 is provided between the pocket and the interior of the vessel 160, the passage 164 permitting water to flow from the overflow pipe and the pocket into the vessel proper.

Figure 5:
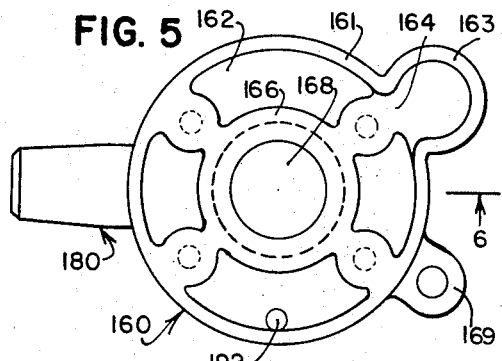
FIG. 5 is an enlarged plan view taken along the line 5—5 in FIG. 2, illustrating the vessel forming part of the float-operated magnetically controlled valve means of the present invention, with the float removed therefrom.

The bottom wall 162 of the vessel is provided with a first upturned portion 165 which cooperates with a separate valve casing 180 to provide a chamber 166 therebetween. The bottom wall 162 is further provided with a second upturned portion 167 in the form of a cylinder, the internal surface thereof defining a vertical guide passage for a plunger 190 disposed therein. The upturned portion 167 defining the guide passage terminates in an upper stop member 168 which limits upward movement of the plunger 190 therein. As shown in FIG. 5, an outwardly extending tab 169 is provided on the vessel side wall 161 whereby the vessel 160 is secured to the partition 43 of the beverage brewer.

A float 170 is disposed within the vessel 160 and includes a generally cylindrical side wall 171, a top wall 172 and a bottom wall 173. The diameter of the float 170 is only slightly less than the inner diameter of the vessel 160, whereby the side wall 161 of the vessel serves as a guide surface for the float. The bottom wall 173 of the float is provided with an upturned portion 174 within which is disposed a permanent magnet 175, the magnet being heat staked to the float as at 176. The float normally assumes the position illustrated in FIGS. 6 and 7 wherein the magnet 175 abuts the stop position 168 of the vessel, the float being movable away from the stop member upon the introduction of water into the vessel.

As previously noted, a valve casing 180 is secured to the bottom wall 162 of the vessel, the casing being held in position by a plurality of screws 181 which are threaded into appropriately provided thickened portions of the bottom wall 162 of the vessel. The casing 180 is provided with a threaded inlet passage 182 which is adapted to be connected by an appropriate fitting to the conduit 136, and a threaded outlet passage 183 which is adapted to be connected to the conduit 141 which leads to the flow restrictor 145. A centrally located ported valve seat 184 is provided in the casing between the inlet and outlet passages 182 and 183 respectively.

As previously noted, the valve casing 180 and the first upturned portion 165 of the bottom wall of the vessel 160 cooperate to define a chamber 166 therebetween. Extending across the chamber is a flexible diaphragm 185 of rubber or the like which is engageable with the valve seat 184 for effecting a closed valve condition. The diaphragm 185 includes a main body portion 186 for engagement with the valve seat 184 and is provided with a relatively flexible annular portion 187 which terminates in a peripheral bead whereby the diaphragm is mounted between the vessel bottom wall and the valve casing in a manner which provides a fluid tight connection therebetween. The diaphragm 185 divides the chamber 166 into upper and lower compartments 166U and 166L, respectively.

The diaphragm 185 has a centrally located aperture 188 therein and a pair of side apertures 189 disposed along the flexible annular portion thereof, the central aperture 188 being located over the valve seat 184 and being substantially larger than the apertures 189 which are exposed to the inlet passage 182 at all times.

Figures 7, 8:
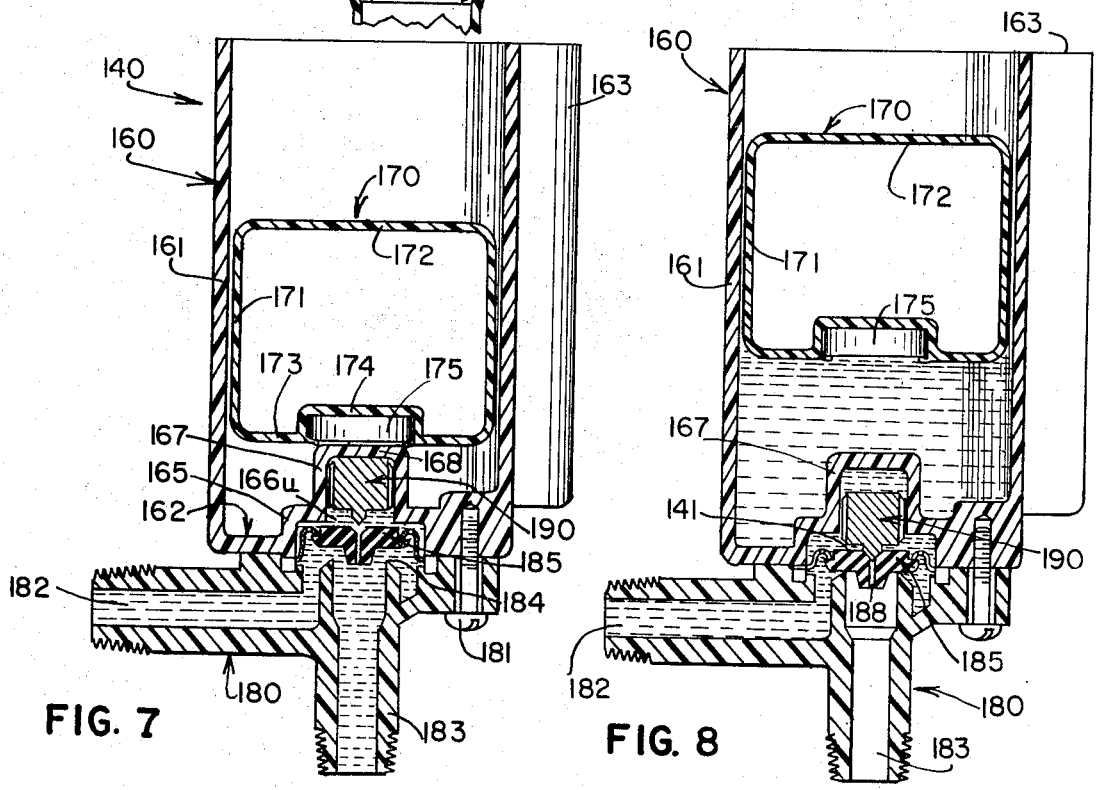
FIG. 7 is a sectional view similar to FIG. 6, illustrating the position of various parts of the magnetically controlled valve means in an open position when water is being introduced into the machine.
FIG. 8 is a view similar to FIGS. 6 and 7, illustrating the position of the various parts of the magnetically controlled valve means in the closed position.

As previously noted, a plunger 190 is disposed within the guide surface defined by the wall portion 167 of the vessel, the plunger 190 having a pointed tip at 191 which is engageable at the lower end of movement thereof with the diaphragm 185 to close off or seal the central or discharge aperture 188 therein, as illustrated in FIG. 8.

Figure 6:
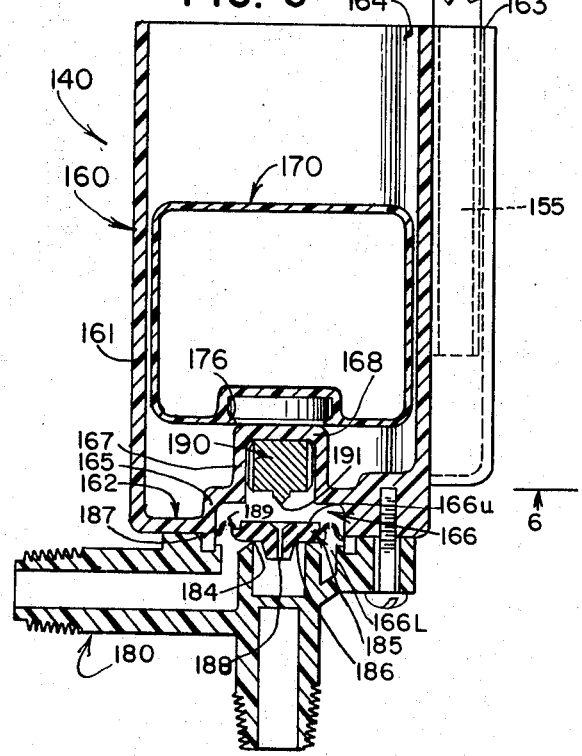
FIG. 6 is a sectional view of the float-operated magnetically controlled valve means of the present invention, taken along the line 6—6 in FIG. 5 and illustrating the position of the various parts thereof prior to the initiation of a brew cycle of the machine.

The plunger 190 is formed of magnetic stainless steel and in the absence of water within the vessel 160, so that the float 170 is in the position illustrated in FIG. 6, the magnetic field of attraction between the magnet 175 and the magnetic plunger 190 is sufficient to maintain the plunger 190 in an "open" position of engagement with the stop portion 168.

In operation, when the electrically operated valve 135 is opened to permit water to flow therethrough, the water will flow through the conduit 136 into the inlet passage 182 of the valve 140. The water will then flow through the side apertures 189 in the diaphragm 185 and out the central or discharge aperture 188 thereof. Because the discharge aperture 188 is substantially larger than the side apertures 189, the water passing through the side apertures into the upper compartment 166U flows out of the central or discharge aperture 188 as fast as it enters so as to provide a lower pressure in the upper compartment. The inlet pressure on the lower side of the diaphragm 185 thereby is able to raise the diaphragm 185 off of the ported seat 184 to the position illustrated in FIG. 7, whereby the major portion of the water flow is directed beneath the diaphragm 185 and directly out of the outlet passage 183 and through the rest of the water inlet system heretofore described.

In the event of a malfunction which results in an incomplete closing of the electrically controlled valve 135, or a malfunction in the float mechanism 70, the water within the tank will rise until it exceeds the height of the overflow pipe 155, whereupon excess water will flow through the pipe 155 into the pocket 163 of the vessel 160 and through the passage 164 between the pocket and the vessel side wall so as to cause the float 170 to rise therein. As the water continues to enter and the float continues to rise, the magnet 175 moves away from the plunger 190 which is limited in upward movement by the stop portion 168 of the bottom wall. The plunger 190 will remain in position until the magnetic field of attraction between it and the magnet 175 is weakened to a point where the magnet 175 can no longer hold the plunger 190 in its upper or "open" position. When this occurs, the plunger 190 drops immediately into the lowermost position thereof as indicated in FIG. 8, thereby closing the discharge passage 188 of the diaphragm.

Upon the closing of the central or discharge aperture 188 by engagement of the plunger 190 therewith as described, the inlet water passing through the side apertures 189 immediately builds up substantial pressure within the upper compartment 166U sufficient to exert a differential downward force upon the diaphragm 185 so as to cause an immediate snap action closing of the main body portion of the diaphragm into watertight engagement with the valve seat 184, thereby positively to terminate the flow of water out of the outlet passage 183 and through the various components into the water tank 40. It will be appreciated that even though the inlet flow of water to the machine is terminated the plunger 190 remains in a closed position until such time as the pressure caused by the incoming water through inlet passage 182 is relieved.

When the cause of the malfunction has been terminated, the water within the vessel 160 is removed via a drain opening 192 in the bottom wall 162 thereof, an appropriate threaded plug (not shown) being provided to seal the drain opening during normal operation. When excess water drains out of the vessel, the float 170 drops to the position illustrated in FIG. 6, wherein the magnet 175 rests against the stop portion 168 of the bottom wall. When the back pressure in the inlet passage 182 is relieved, the magnetic field between the magnet 175 and the magnetic plunger 190 causes the plunger to rise to the open position illustrated in FIG. 6.

In a typical embodiment, the vessel 160 is formed of nylon such as Zytel 31 and has an inner diameter of approximately 1 29/32 inches and an overall length of four inches; the stop portion 168 of the bottom wall being disposed approximately .70 inch from the bottom surface of the bottom wall; the first upturned portion being disposed approximately .265 inch from the lower surface of the bottom wall; the inner diameter of the second upturned portion 167 defining the guide surface being approximately .437 inch, the diameter of the first upturned portion being approximately .825 inch. The float is approximately 1 27/32 inches in diameter and is approximately 1⅝ inches in height. The magnet 175 is about .750 inch in diameter and .375 inch in height, the magnet being formed of a material such as Indox I. The plunger 190 is approximately .468 inch in length, from the upper end to the bottom of the tip 191 thereof, the tip 191 being approximately .093 inch in length. The plunger is formed of stainless steel type 430F which is magnetized after machining. The valve casing 180 and diaphragm 185 are of the type included in the valve sold by the Dole Valve Company as its Model S-30 valve.

The upper end of the overflow pipe 155 is disposed about 8 21/32 inches from the bottom wall of the tank, the upper end of the pipe being disposed about 3/16 inch above the uppermost adjustable limit of movement of the float 71, in which case the tank can receive approximately 6 ozs. of water in excess of the maximum predetermined amount which the float will normally admit before causing the valve 135 to close. Using a vessel and float having the dimensions given, the vessel will receive approximately 2½ ozs. of overflow water before the float is raised sufficiently high (about ¼") to cause the plunger 190 to drop and terminate flow of water through the valve 140.

It will be appreciated from the foregoing that the valve 140 will operate to the closed position thereof upon the introduction into the water tank 40 of a quantity of water in excess of the predetermined quantity admitted for brewing purposes. Furthermore, the valve 140 is simple in both operation and construction, including a minimum of moving parts, namely the float 170, diaphragm 185 and plunger 190. Moreover, by forming the bottom wall of the vessel in the manner disclosed, the vessel may be combined with component valve parts currently available, the bottom wall of the vessel providing one wall of the chamber for the diaphragm and also the guide surface for the plunger, while permitting direct operation of the permanent magnet carried by the float on the plunger.

Figure 9:
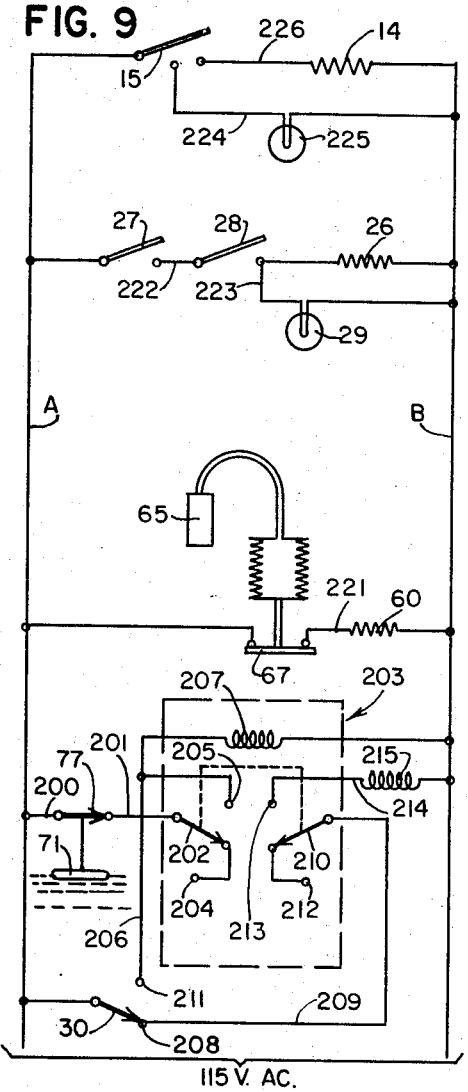
FIG. 9 is one form of electrical circuit which may be employed with the automatic beverage brewing machine disclosed herein.

Referring now to FIG. 9, there is shown a typical electrical circuit for the beverage brewing machine 10, the input to the electrical circuit of FIG. 9 being on a pair of line conductors designated as A and B and connected through suitable switches and fuses (not shown) to a suitable 115 volt 60 cycle a.c. supply.

As illustrated, a branch conductor 200 is connected to the line conductor A, the conductor 200 being connected to a first terminal of the float actuated reed switch 77, the second terminal of the switch 77 being connected through a conductor 201 to one terminal of a first switch 202 of a double pole, double throw relay, designated generally as 203. The switch 202 is normally disposed in the position shown in FIG. 8 wherein it contacts a dead terminal 204 in the relay 203. When the relay is energized as hereinafter described the switch 202 is caused to move to a second position thereof wherein it engages a contact 205 of the relay 203, the contact 205 being connected through a conductor 206, to a first terminal of the relay coil 207, the second terminal of the relay coil 207 being connected to the line conductor B, thereby to provide a holding circuit through the relay.

The branch conductor 200 is also connected to one terminal of the manually operated switch 30, the switch 30 having two operative positions. The switch 30 is normally in the position shown in FIG. 8 where it engages contact 208 thereof, contact 208 being connected by the conductor 209 to one terminal of a second switch 210 in the relay 203.

When the switch 30 is depressed by the operator it momentarily engages the second contact 211 thereof which is connected through conductor 206 to the coil 207 as previously described, whereby depression of the switch 30 causes the relay 203 to be energized, causing switch 202 therein to close and provide the holding circuit for the relay.

The second switch 210 in the relay is normally in the position shown in FIG. 8, wherein it engages a dead contact 212 in the relay; energization of the relay 203 causing the switch 210 to move to a second position thereof wherein it engages contact 213 in the relay, contact 213 in the relay being connected by a conductor 214 to the coil 215 of the solenoid operated water inlet valve 135, the second terminal of the coil 215 being connected to the line conductor B.

When the switch 30 is closed to engage contact 211, a completed circuit is provided through the line conductor A, conductor 200, switch 30, conductor 206, relay coil 207 and line conductor B. At this time the relay 203 is energized and causes switches 203 and 210 to engage contacts 205 and 213 respectively. When the relay 202 is energized a holding circuit therefor is completed through conductor 200, float operated switch 77, conductor 201, switch 202, contact 205, conductor 206, relay coil 207 and line conductor B.

The switch 30 is a momentary type switch which is normally spring biased so that after it completes the circuit through conductor 200 it returns to the position shown in FIG. 8. At this time a circuit is also completed through conductor 200, switch 30, conductor 209, switch 211, contact 215, conductor 214 and the coil 215 for the valve 135, whereby cold water is allowed to flow through the water inlet system as previously described.

When the hot water in the water tank reaches the maximum predetermined level therein, indicated as 95, the float actuated switch 77 opens to deenergize relay 203, thereby causing the switch 210 to engage the dead contact 212 in the relay and thus deenergize the coil 215 to prevent further introduction of cold water to the hot water tank.

Also as illustrated, the conductor A is connected to one terminal of a tank thermostat switch 67, the other terminal of the thermostat switch 67 being connected through a conductor 221 to one terminal of the heating coil 60 for the water tank 40. The second terminal of the coil 60 is connected to the conductor B. The operation of the heating unit 60 under control of the thermostat switch 67 is fairly conventional, the switch 67 being closed to provide a circuit through the heating coil 60 when the temperature of the water within the tank drops below a preselected value.

As previously noted, the upper heating unit 26 is controlled by both a thermostatically controlled switch 27 and a manual switch 28, one terminal of the switch 27 being connected to the main conductor A and the other terminal thereof being connected to a conductor 222 which in turn is connected to one terminal of the manually controlled switch 28. The other terminal of the manual switch 28 is connected to a conductor 223, one terminal of the pilot light 29 being connected to one branch of the conductor 223 and the upper heating unit 26 also having one terminal connected to the conductor 223. The other terminal of the pilot light 29 is connected to the line conductor B; similarly, the other terminal of the heating element 26 is also connected to the line conductor B.

The upper heating unit 26 is used to maintain a previously brewed beaker of coffee at a predetermined temperature. In operation, the beaker containing the brewed coffee is placed on the upper heating unit 26, and the manual control switch 28 is closed. If the brewed beverage within the beaker is already at the predetermined temperature, the thermostatically controlled switch 27 will remain open so as to open the circuit through the heating element 26, the switch 27 remaining open so long as the beverage is at the predetermined temperature. As the beverage within the beaker cools below the predetermined temperature, the thermostatically controlled switch 27 closes to complete the circuit through the line conductor A, the switch 27, the conductor 222, the switch 28, the conductor 223, the upper heating unit 26, the pilot light 29 and the line conductor B, thereby to energize the heating unit 26 so as to heat the beverage within the beaker. When the temperature of the beverage in the beaker reaches the predetermined value, the thermostatically controlled switch 27 opens to break the circuit and deenergize the heater 26. The preferred temperature at which the beverage should be maintained by the heating unit 26 is $175° \pm 5°F$.

One terminal of the switch 15 for the lower heater 14 is also connected to the main conductor A, a second terminal of the switch 15 being connected through a conductor 224 to one terminal of a light 225, the second terminal of the light 225 being connected to the line conductor B. A third terminal of the switch 15 is connected through a conductor 226 to one terminal of the heating element 14, the other terminal of the heating element 14 being connected to the main conductor B, whereby closing of the switch 15 causes both the heating element 14 and the light 225 to be energized.

In operation, it will be assumed that the water tank 40 is initially filled with water to the level indicated at 90 in FIG. 2 and that the tank heater 60 under the control of the tank thermostat 65 is energized to bring the water within the tank to a predetermined temperature, the thermostat switch 67 being closed and opened in such manner as to maintain the temperature of the water in the water tank 40 in the neighborhood of $191° \pm 4°F$.

When it is desired to cause coffee extract to flow into the beaker 39 the latter is positioned on the heating element 14 and the control switch 15 is closed to energize the heating element 14 and also to cause the indicating light 225 for the switch to be energized. A supply of fresh ground coffee is placed in a cup of filter paper within the brew basket 37. The basket 37 is then inserted below the discharge head 35.

The manual cycle control switch 30 is then momentarily depressed causing the relay 203 to be energized in the manner heretofore described, energization of the relay causing the switch 210 therein to complete a circuit through the coil 215 of the inlet valve 135 and thereby causing cold water to flow through the water inlet valve 135, the magnetically controlled valve 140, the flow restrictor 145 and through the delivery conduit 150 into the upper end of the tube 50. The cold water flows directly through the tube 50 into the lower portion of the water tank 40 thereby causing hot water contained therein to be upwardly displaced in the tank 40.

Concurrently therewith, the flow restrictor 145 develops a back pressure which causes some of the entering cold water to flow through the conduit 115 to the inlet passage 111 of the discharge valve 100, the inlet water pressure causing the plunger 120 in the valve 100 to move to the closed position thereof as illustrated in FIG. 4. When the valve 100 is in the closed position thereof hot water is prevented from discharging from the water tank 40 through the discharge block 80.

As the hot water continues to rise in the water tank 40, the float 71 will eventually rise therewith until such time as the magnet 75 carried by the arm 74 moves sufficiently far away from the reed switch 77 to permit the reed switch to open, thereby deenergizing the relay 203 and the coil 215 for the water inlet valve 135.

When the water inlet valve 135 is deenergized and the inlet flow of water terminated, there is no longer back pressure developed by the flow restrictor 145, whereby the force of the spring 129 and the head pressure of the hot water in the inlet passage 102 are sufficient to cause the plunger 120 to move to the discharge position thereof as illustrated in FIG. 3, at which time hot water can flow through the discharge block 80, the discharge valve 100 and the discharge line 85, and the discharge head 35 to be sprayed over the ground coffee in the brew basket 37, until all of the hot water in the upper portion of the water tank flows out of the discharge water line and the water level in the water tank reaches the standby position 90 therein, at which time the brewing cycle is completed.

Using a tank having a "fill" capacity of approximately 60 ozs. and using a flow restrictor which introduces water to the tank at the rate of approximately one gallon per minute, it will take approximately 30 seconds to fill the tank with the predetermined quantity of cold water. It will then take approximately two minutes to discharge a like quantity of hot water from the tank through the discharge block, the discharge valve and the discharge head, and approximately another 1¼ minutes for the hot water to completely filter through the coffee grounds in the brew basket for discharge into the beaker, whereby the total elapsed time for a brewing cycle is approximately 3¾ minutes to 4 minutes.

It will be apparent from the foregoing that the discharge valve 100 and the float actuated switch mechanism 70 cooperate with the water inlet valve 135 in a unique manner, the discharge valve being operable in response to operation of the water inlet valve 135 to prevent discharge of hot water from the tank while the valve 135 is open to introduce cold water into the tank, whereupon upward displacement of hot water in the tank to a predetermined level therein is effective to close the inlet water valve.

Because the volumetric capacity of the tank between the lower end of the discharge block 80 and the actuating position of the float is substantially constant, only a predetermined quantity of cold water can be introduced to the machine during each cycle, and, because of the location of the discharge block in the tank side wall, only that predetermined quantity of cold water which is admitted to the tank will be discharged as hot water therefrom. By providing predetermined amounts of ground coffee 38 on the disposable filter cup in the brew basket 37 and by maintaining the temperature of the water in the water tank 40 at a predetermined value, it is possible to make the coffee extract under identical controlled conditions for each brewing cycle.

Furthermore, the overflow control provided by the overflow pipe 155 and the float-operated magnetically controlled valve 140 insure that in the event of a malfunction in the machine which results in the introduction of a quantity of water in excess of the predetermined quantity, the flow of input water to the machine will positively terminate.

While there has been described what is at present considered to be the preferred embodiment of the invention, it will be understood that various modifications may be made therein, and it is intended to cover in the appended claims all such modifications as fall within the true spirit and scope of the invention.

We claim:

1. A float operated magnetically controlled valve comprising, in combination, a vessel having a side wall and a bottom wall, said bottom wall having a generally vertically arranged guide surface integrally formed therein and having stop means formed at the upper end of said guide surface, a float disposed within said vessel and movable between upper and lower positions therein relative to said bottom wall in response to the introduction of fluid into said vessel, said float having first magnetic means secured to a bottom surface thereof for movement therewith relative to said bottom wall, a casing carried by said bottom wall and overlying said guide surface and having a fluid inlet and a fluid outlet, apertured means disposed in said casing between said fluid inlet and said fluid outlet, second magnetic means disposed within said guide surface and being reciprocally movable between an obstructing position of engagement with said apertured means for preventing the flow of fluid through the aperture thereof and out said fluid outlet and a non-obstructing position of engagement with said stop means for permitting the flow of fluid through said apertured means, said first magnetic means carried by said float being operative to maintain said second magnetic means in the non-obstructing position of engagement with said stop means only so long as said float is in the lower position thereof, said stop means preventing said second magnetic means from moving with said first magnetic means carried by said float when said float rises upon the introduction of fluid into said vessel whereby the magnetic field of attraction between said first and second magnetic means diminishes to allow said second magnetic means to freely move to the obstructing position of engagement with said apertured means.

2. The float-operated magnetically controlled valve set forth in claim 1, wherein said vessel and said float and said casing are all formed of a nonmagnetic material.

3. The float-operated magnetically controlled valve set forth in claim 2, wherein said vessel and said casing are formed of nylon and said float is formed of a high density polyethylene.

4. The float-operated magnetically controlled valve set forth in claim 1, wherein said side wall of said vessel includes a vertically extending pocket formed therein for receiving the lower end of an associated overflow line and a passage in said side wall between said pocket and said vessel whereby water from said overflow line enters said vessel from the side wall thereof and thereby does not interfere with upward movement of said float.